US008412177B2

(12) United States Patent
Lee et al.

(10) Patent No.: US 8,412,177 B2
(45) Date of Patent: Apr. 2, 2013

(54) METHOD AND APPARATUS FOR TRANSMITTING/RECEIVING SYSTEM INFORMATION IN BROADBAND WIRELESS COMMUNICATION SYSTEM

(75) Inventors: Neung-Hyung Lee, Seoul (KR);
Sung-Oh Kwon, Seoul (KR);
Kyeong-In Jeong, Hwaseong-si (KR);
Jong-In Kim, Seongnam-si (KR);
Ho-Sun Youm, Seoul (KR);
Jong-Hyung Kwun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 791 days.

(21) Appl. No.: 12/430,316

(22) Filed: Apr. 27, 2009

(65) Prior Publication Data
US 2009/0275326 A1 Nov. 5, 2009

(30) Foreign Application Priority Data
Apr. 30, 2008 (KR) ........................ 10-2008-0040501

(51) Int. Cl.
*H04W 4/00* (2009.01)
(52) U.S. Cl. ..................... 455/422.1; 455/436; 455/437; 455/444; 455/446
(58) Field of Classification Search .............. 455/422.1, 455/435.1, 435.2, 436–439, 444, 446
See application file for complete search history.

(56) References Cited

U.S. PATENT DOCUMENTS

| 8,010,138 B2 * | 8/2011 | Kuru ............................. 455/502 |
| 2008/0244148 A1 * | 10/2008 | Nix et al. ........................ 710/313 |
| 2009/0052418 A1 * | 2/2009 | Semper ......................... 370/338 |
| 2009/0092097 A1 * | 4/2009 | Nylander et al. ............. 370/331 |
| 2009/0253461 A1 * | 10/2009 | Kuwahara ..................... 455/561 |
| 2009/0262689 A1 * | 10/2009 | Jeong et al. .................... 370/329 |

* cited by examiner

Primary Examiner — Rafael Pérez-Gutiérrez
Assistant Examiner — Suhail Khan
(74) Attorney, Agent, or Firm — Jefferson IP Law, LLP

(57) ABSTRACT

A method and an apparatus for transmitting and receiving System Information (SI) of a femto base station in a wireless communication system are provided. In the method, an SI transmission point is determined using unique identification information of a femto base station itself and unique identification information of a macro base station with which the femto base station is associated. Each of user equipment and the macro base station generate a measurement gap pattern representing an SI reception point using the unique identification information of the femto base station and the unique identification information of the macro base station. SI is received from the femto base station according to the generated measurement gap pattern.

6 Claims, 11 Drawing Sheets

METHOD AND APPARATUS FOR TRANSMITTING/RECEIVING SYSTEM INFORMATION IN BROADBAND WIRELESS COMMUNICATION SYSTEM

PRIORITY

This application claims the benefit under 35 U.S.C. §119 (a) of a Korean patent application filed in the Korean Intellectual Property Office on Apr. 30, 2008 and assigned Serial No. 10-2008-0040501, the entire disclosure of which is hereby incorporated by reference.

BACKGROUND OF THE INVENTION

1. Field of the Invention

The present invention relates to a broadband wireless communication system. More particularly, the present invention relates to a method and an apparatus for transmitting/receiving System Information (SI) including a Global Cell IDentifier (GCID) of a femto base station.

2. Description of the Related Art

In a cellular wireless communication system, a channel may deteriorate due to one or more of a geographical factor inside a cell, a distance between User Equipment (UE) and a base station, and movement of the UE, so that communication between the UE and the base station is hampered. More particularly, when a UE is located inside a closed building such as an office or a household, a channel between a base station and the UE may be deteriorated in a region referred to as a shadow region. The UE located in the shadow region has difficulty in communicating with the base station.

A pico cell concept is being proposed to provide a service to the indoor shadow region, and a femto cell concept is being proposed to provide a data service of a far higher level to even more users while addressing a service limitation of the indoor shadow region. The femto cell has a smaller coverage area then that of a macro cell. A plurality of femto cells may be installed inside one macro cell area.

As a plurality of femto cells are installed inside one macro cell area as described above, a Physical Cell IDentifier (referred to as 'PCID' hereinafter) which is one of identifiers identifying the femto cell may be repeatedly used inside one macro cell area. That is, since 3rd Generation Partnership Project (3GPP) and 3GPP2 standards allow for a reuse of the PCID, two or more femto cells included inside one macro cell area may have the same PCID. Therefore, the macro cell cannot identify a femto cell of a relevant cell using only a PCID of an adjacent cell reported by a UE.

Therefore, a method of allowing each femto cell to report the PCID and a Global Cell IDentifier (GCID) together is being discussed, and, a method of allowing a UE to obtain the GCID from a femto cell is being discussed.

The GCID is included in System Information (SI) that includes information of a relevant femto cell and is transmitted, and each UE receives the SI during a predefined measurement gap assigned for cell searching by a serving base station.

The conventional art provides two techniques for receiving SI from a base station of the femto cell. One is a technique of lengthening a measurement gap and increasing a probability that SI is received for the lengthened gap. However, it is difficult to use this technique when a time of suspending data transmission/reception is not as long as in a Voice over Internet Protocol (VoIP).

The other is a technique of requesting and receiving a separate measurement gap pattern from a base station of a macro cell in order to search for the base station of the femto cell. For this purpose, a signaling message exchange as illustrated in FIG. 1 is used.

FIG. 1 is a view illustrating a signal flow for reception of SI in a conventional broadband wireless communication system. Referring to FIG. 1, in step 110, UE 100 determines if a measurement gap pattern for receiving SI is needed. In step 112, the UE 100 requests a macro base station (macro eNB) 104 to transmit the measurement gap pattern. In step 114, the macro base station 104 generates the measurement gap pattern for the SI using information of a relevant femto base station, and in step 116, transmits the generated measurement gap pattern to the UE 100. In step 118, the UE 100 searches for neighboring femto base stations during the measurement gap. In step 120, the UE 100 enters a region of a femto base station (femto eNB) 102 identified during the search. In step 122, the UE 100 receives SI transmitted from the femto base station 102 during the measurement gap.

As described above, the technique of being assigned the measurement gap pattern requires a signaling exchange between a macro base station and UE. When the macro base station does not have information for a relevant femto base station, the technique additionally requires a signaling exchange (210) between a macro base station (macro eNB) 202 and the relevant femto base station (femto eNB) 200 as illustrated in FIG. 2. FIG. 2 is a detailed view illustrating a signal flow for reception of SI in a conventional broadband wireless communication system. That is, since the technique of being assigned the measurement gap pattern requires signaling between the macro base station and the femto base station in addition to signaling between the UE and the macro base station, an additional delay may occur during a handover.

Therefore, there is a need for a new technique which may receive SI even when there is a short amount of time for suspending transmission/reception, and which does not require a complicated signaling message exchange.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for transmitting/receiving system information including a Global Cell IDentifier (GCID) of a femto base station in a broadband wireless communication system.

Another aspect of the present invention is to provide a method and an apparatus for determining a System Information (SI) reception point without a separate signaling message exchange in a broadband wireless communication system.

Still another aspect of the present invention is to provide a method and an apparatus for determining an SI transmission point of a femto base station using unique identification information of a macro base station and unique identification information of the femto base station in a broadband wireless communication system.

Yet another aspect of the present invention is to provide a method and an apparatus for generating a measurement gap pattern representing an SI reception point of a femto base station in a broadband wireless communication system.

In accordance with an aspect of the present invention, an SI transmission method of a femto base station in a wireless communication system is provided. The method includes receiving unique identification information of a macro base station with which a femto base station is associated, determining an SI transmission point using unique identification information of the femto base station itself and the received unique identification information of the macro base station, and transmitting SI including a GCID every SI transmission point.

In accordance with another aspect of the present invention, a measurement gap pattern transmission method of a macro base station, for informing user equipment of an SI transmission point of a femto base station in a wireless communication system is provided. The method includes receiving unique identification information of at least one femto base station included in a Closed Subscriber Group (CSG) from the user equipment, generating at least one measurement gap pattern representing a point at which SI of the at least one femto base station is transmitted using unique identification information of the macro base station itself and the unique identification information of the at least one femto base station, and transmitting the generated at least one measurement gap pattern to the user equipment.

In accordance with still another aspect of the present invention, a method of user equipment which receives SI of a femto base station in a wireless communication system is provided. The method includes transmitting unique identification information of at least one femto base station included in a CSG to a macro base station, generating at least one measurement gap pattern representing an SI reception point using unique identification information of the macro base station and the unique identification information of the at least one femto base station, and receiving SI from the at least one femto base station according to the generated at least one measurement gap pattern.

In accordance with further another aspect of the present invention, an SI transmission apparatus of a femto base station in a wireless communication system is provided. The apparatus includes a receiver for receiving unique identification information of a macro base station with which a femto base station is associated, a transmission point determiner for determining an SI transmission point using unique identification information of the femto base station itself and the received unique identification information of the macro base station, and a transmitter for transmitting SI including a GCID every SI transmission point.

In accordance with yet another aspect of the present invention, a measurement gap pattern transmission apparatus of a macro base station, for informing user equipment of an SI transmission point of a femto base station in a wireless communication system is provided. The apparatus includes a receiver for receiving unique identification information of at least one femto base station included in a CSG from a user equipment, a measurement gap pattern generator for generating at least one measurement gap pattern representing a point at which SI of the at least one femto base station is transmitted using unique identification information of the macro base station itself and the unique identification information of the at least one femto base station, and a transmitter for transmitting the generated at least one measurement gap pattern to the user equipment.

In accordance with yet further another aspect of the present invention, an apparatus of user equipment which receives SI of a femto base station in a wireless communication system is provided. The apparatus includes a transmitter for transmitting unique identification information of at least one femto base station included in a CSG to a macro base station, a measurement gap pattern generator for generating at least one measurement gap pattern representing an SI reception point using unique identification information of the macro base station and the unique identification information of the at least one femto base station, and a receiver for receiving SI from the at least one femto base station according to the generated at least one measurement gap pattern.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
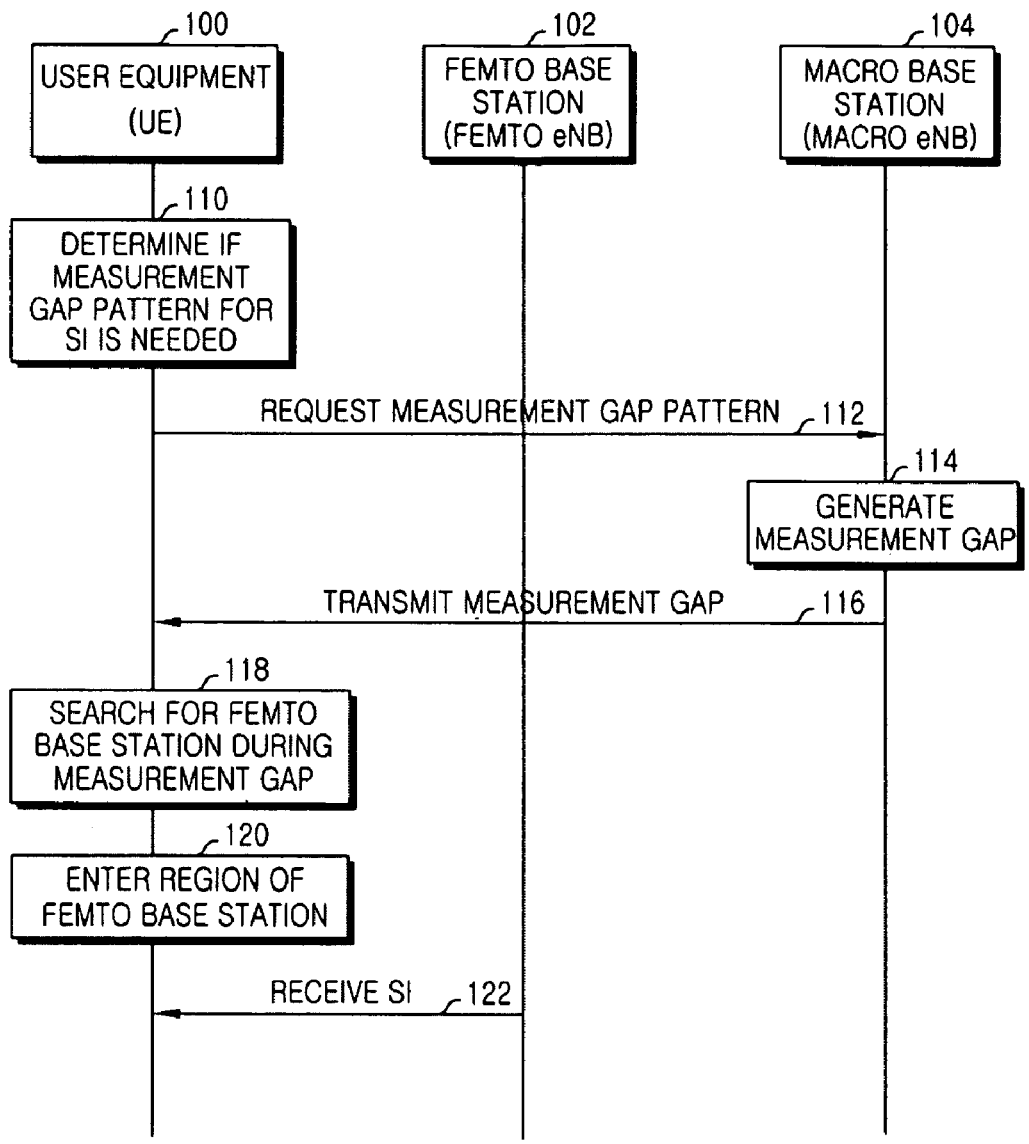
FIG. 1 is a view illustrating a signal flow for reception of System Information (SI) in a conventional broadband wireless communication system.
Figure 2:
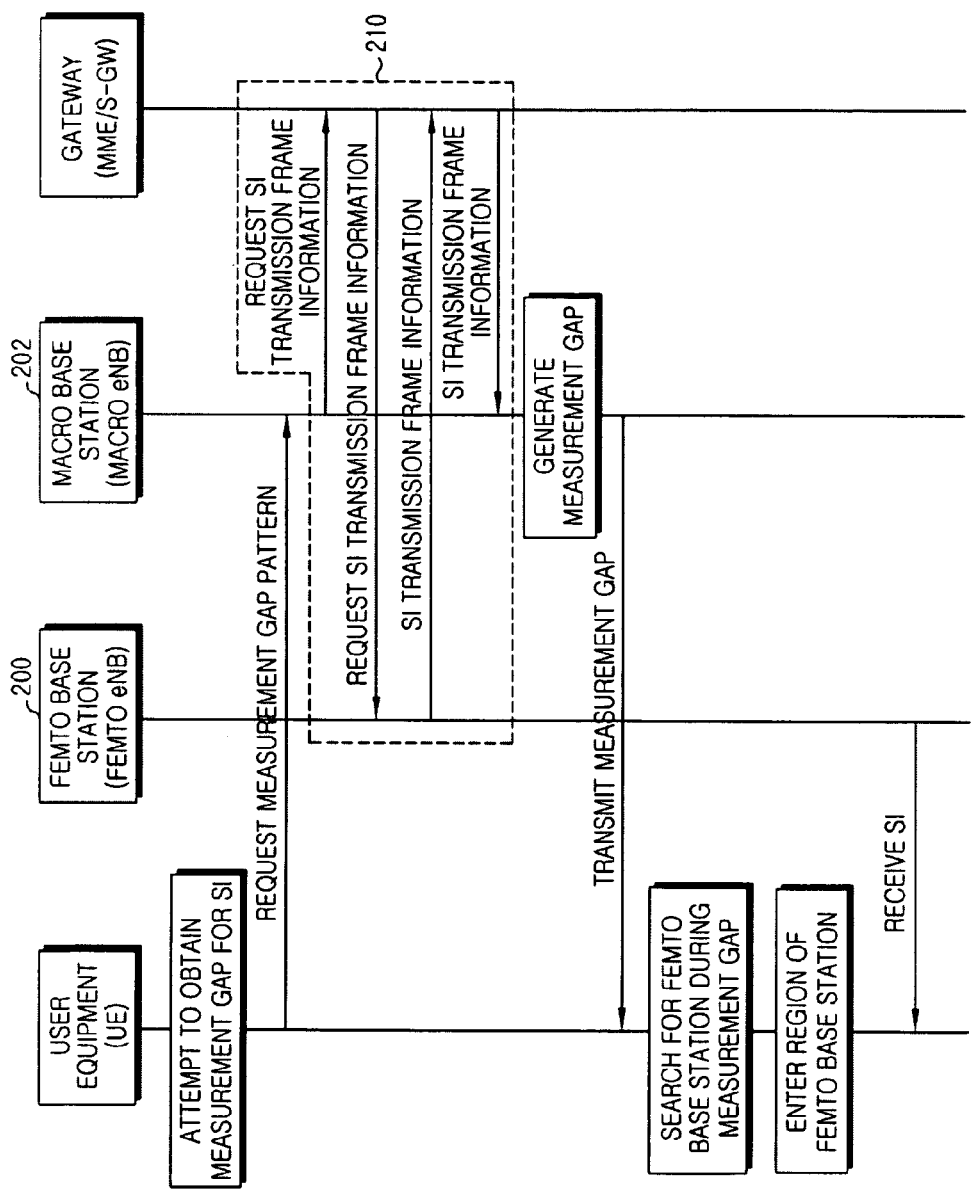
FIG. 2 is a detailed view illustrating a signal flow for reception of SI in a conventional broadband wireless communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a method and an apparatus for determining a System Information (SI) transmission point of a femto base station based on unique identification information of a femto base station (femto eNB or home eNB) and a macro base station (macro eNB), and generating a measurement gap pattern representing an SI reception point in a broadband wireless communication system. Hereinafter, an Orthogonal Frequency Division Multiplexing (OFDM) system is illustrated by way of example. Note that exemplary embodiments of the present invention are applicable to a communication system which uses a different scheme such as Code Division Multiple Access (CDMA).

In exemplary embodiments of the present invention, it is assumed that a User Equipment (UE) stores a unique IDentifier (ID) of a femto base station which is associated with a Closed Subscriber Group (CSG) and an access allowance list (white list or fingerprint) representing a unique ID of a macro base station including the femto base station. Here, the CSG includes femto base stations which the UE may enter.

In addition, in exemplary embodiments of the present invention, it is assumed that frames of the UE, the femto base station, and the macro base station are synchronized. Here, it is assumed that a frame of the femto base station is synchronized with a frame of the macro base station with which the femto base station itself is associated. Also, it is assumed that when the UE enters a macro base station including a femto base station corresponding to the CSG, a frame of the UE is synchronized with a frame of the relevant macro base station. At this point, frame synchronization indicates that index numbers of frames currently transmitted/received are matched with each other, and the frame index is recognized in a Media Access Control (MAC) layer as well as in a physical layer.

An exemplary embodiment of the present invention provides a method that includes a process of determining an SI transmission point at a point where a femto base station is installed, and a process where a UE enters a macro base station and generates a measurement gap pattern for receiving SI. The method is described with reference to FIG. 3.

Figure 3:
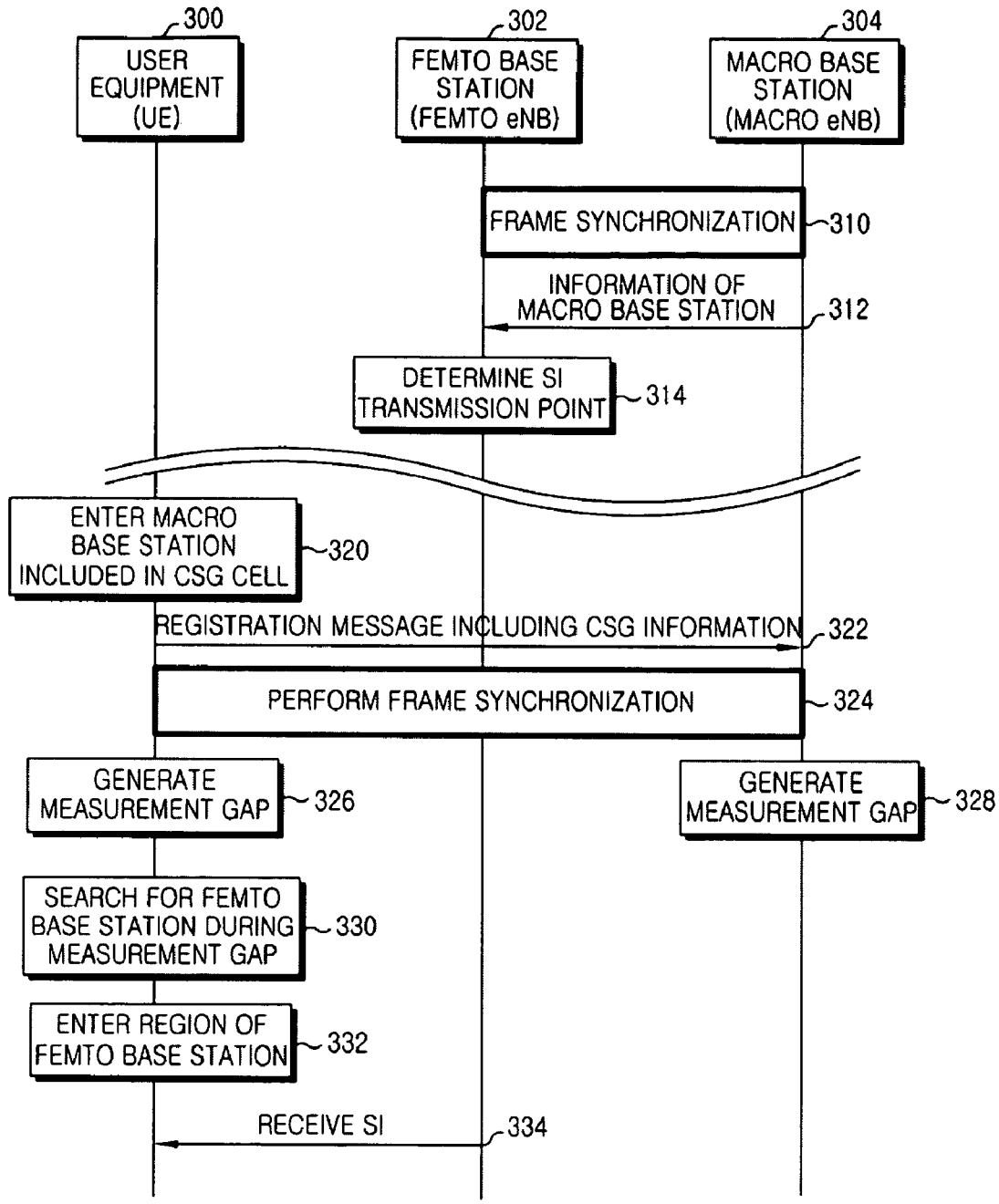
FIG. 3 is a view illustrating a signal flow for reception of SI in a broadband wireless communication system according to an exemplary embodiment of the present invention.

FIG. 3 is a view illustrating a signal flow for reception of SI in a broadband wireless communication system according to an exemplary embodiment of the present invention.

Referring to FIG. 3, in step 310, when a femto base station 302 is installed, the femto base station 302 and a macro base station 304 including the femto base station 302 have their frames synchronized. In step 312, the macro base station 304 transmits its unique ID information to the femto base station 302. In step 314, the femto base station 302, which has received the unique ID information of the macro base station 304, determines an SI transmission point, i.e., a transmission frame index using unique ID information of the femto base station itself 302 and the received unique ID information of the macro base station 304. Here, the unique ID information of the femto base station includes a Global Cell IDentifier (GCID), a CSG ID, and a Tracking Area IDentifier (TA ID), and may include information which combines the GCID, CSG ID, and TA ID. In addition, the unique ID information of the macro base station includes a GCID, a PCID, and a TA ID, and may include information that combines the GCID, PCID, and TA ID. In addition, the CSG ID denotes a femto base station group that a UE may enter. The TA ID denotes a region on which a relevant femto base station can perform paging.

In addition, a transmission frame index of the SI is determined through a predefined equation. At this point, any equation is applicable as far as it is an equation that uses unique IDs of the femto base station and the macro base station. For example, when a frame index is in the range of 0 to N−1, the transmission frame index may be determined using Equation (1) below.

$$(\text{CSG ID of femto base station} + \text{PCID of macro base station}) \bmod N \quad (1)$$

In Equation (1), N denotes a number of frames.

The femto base station 302, which has determined the transmission point of the SI as described above, should transmit the SI at the determined transmission point. Here, the macro base station 304 stores in advance the equation for determining the transmission point of the SI and thus may recognize the transmission point of the SI by receiving the unique ID information of the femto base station while the femto base station is installed, but after the installation of the femto base station is completed, the macro base station 304 may discard the unique ID of the femto base station and transmission point information without storing them. Thereby, a load increase of the macro base station may be prevented.

After the femto base station is installed, in step 320, the UE 300 including the femto base station 302 as a CSG enters the macro base station 304 including the femto base station 302. In step 322, the UE transmits, to the macro base station 304, CSG information, i.e., a registration message including information of femto base stations (for example, unique ID information) which the UE can access. In step 324, the UE 300 and the macro base station 304 have their frames synchronized. In steps 326 and 328, the UE 300 and the macro base station 304 determine a transmission frame index of SI for each femto base station using unique IDs of femto base stations included in the CSG and a unique ID of the macro base station 304, and generate a measurement gap pattern for receiving the SI based on the transmission frame index, respectively. At this point, the measurement gap pattern may be generated to include only a frame having the transmission frame index, or to further include other frames besides the frame having the transmission frame index with consideration of an error in frame synchronization. Here, since the UE 300 and the macro base station 304 generate the measurement gap patterns, respectively, in substantially the same way, the UE 300 is implicitly assigned a measurement gap for reception of SI by the femto base station 302.

In step 330, the UE 300 searches for a relevant femto base station 302 during the measurement gap. In step 332, the UE 300 enters a region of the femto base station 302. In step 334, the UE receives the SI including a GCID from the femto base station 302 during the measurement gap.

Figure 4:
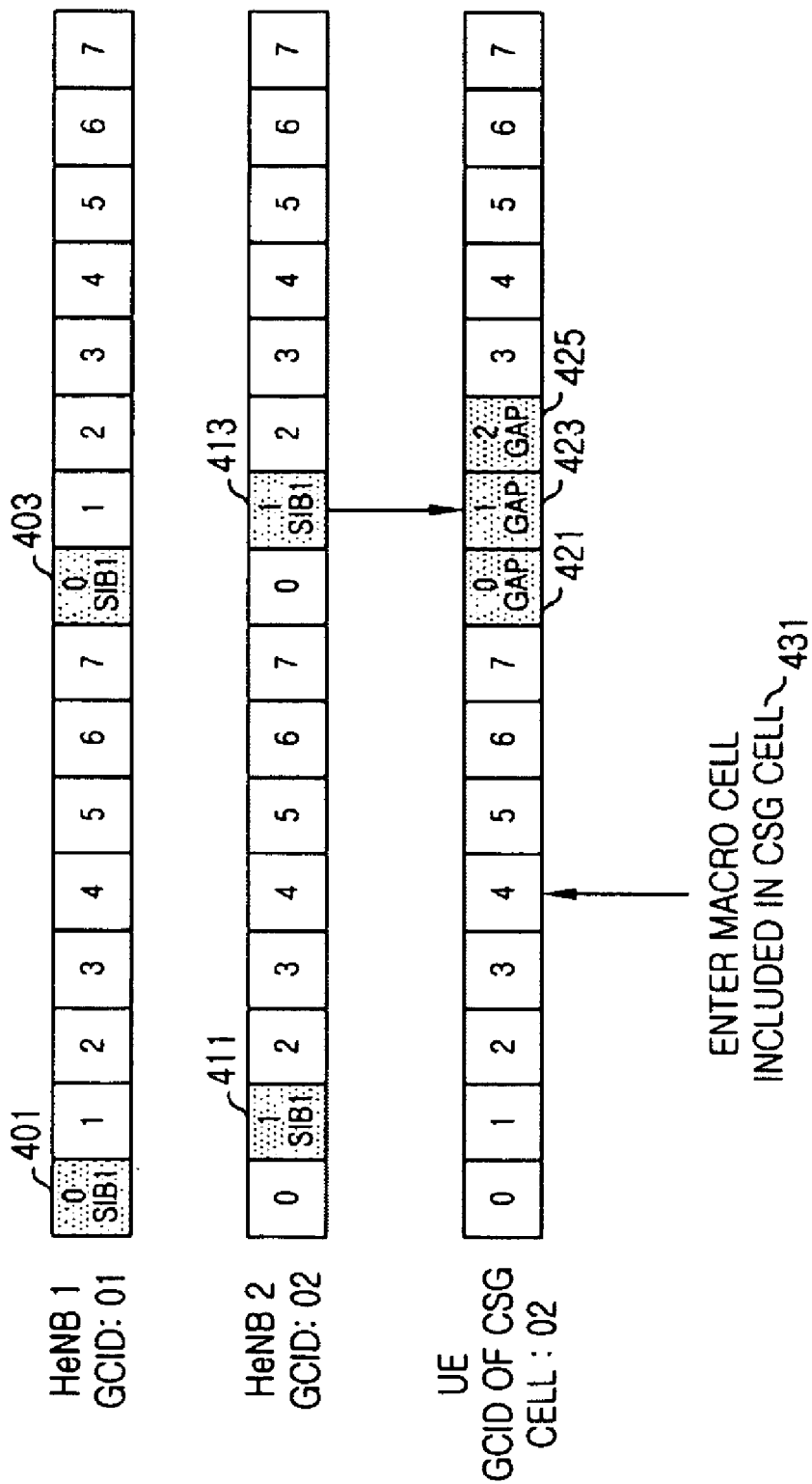
FIG. 4 is a view illustrating an example of a measurement gap pattern for receiving SI in a broadband wireless communication system according to an exemplary embodiment of the present invention.

FIG. 4 is a view illustrating an example of a measurement gap pattern for receiving SI in a broadband wireless communication system according to an exemplary embodiment of the present invention. As illustrated in FIG. 4, when there exists a femto base station HeNB 1 where a transmission point of SI is a frame index 0 (401 and 403), a femto base station HeNB 2 where a transmission point of SI is a frame index 1 (411 and 413), and a UE enters a macro cell included in a CSG cell 431, the UE generates a measurement gap pattern suitable for a transmission point of HeNB 2, which is a femto base station belonging to a CSG of the UE itself, and receives the SI from the HeNB 2. Here, though the UE has generated the measurement gap pattern in order to receive the SI during frames 421, 423, and 425 having indexes of 0 to 2 with consideration of an error in frame synchronization, the UE may generate the measurement gap pattern in order to receive the SI during only a frame having an index 1 without consideration of an error in the frame synchronization.

Figure 5:
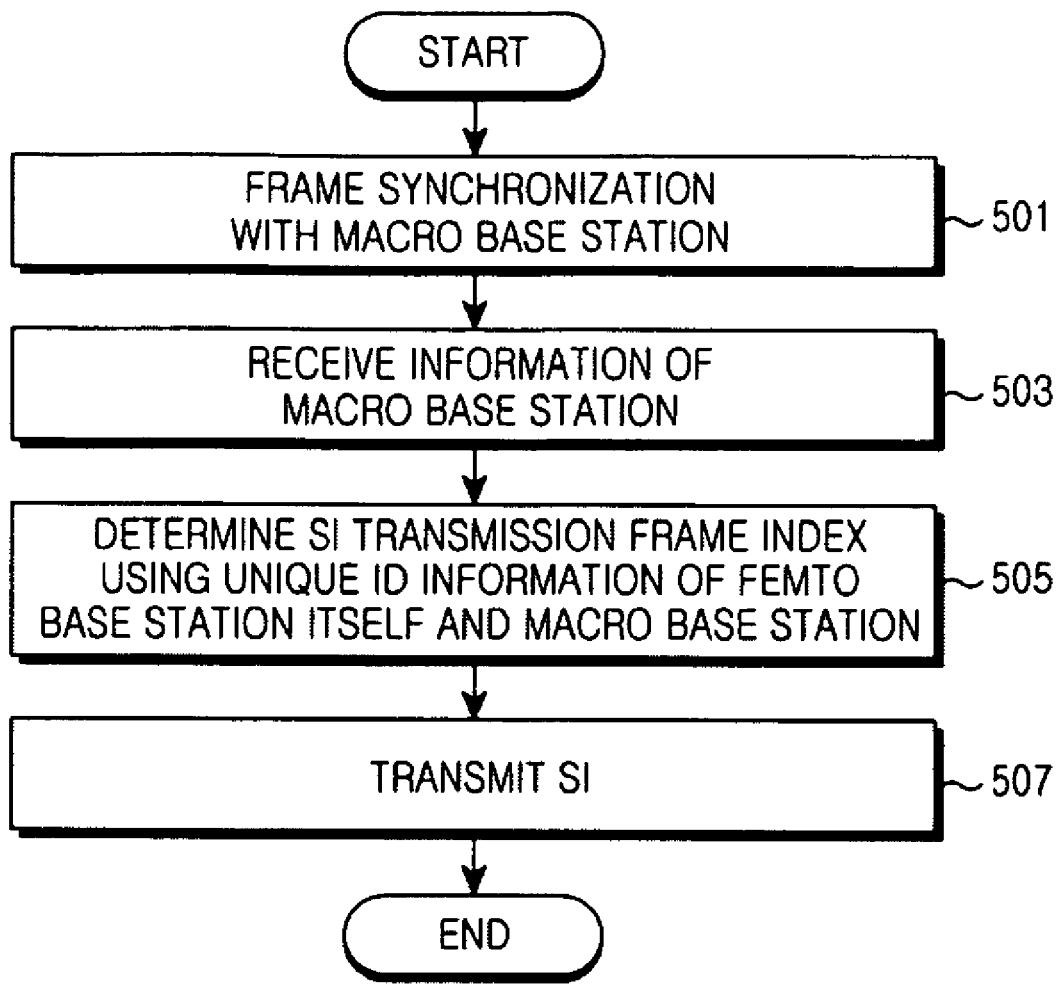
FIG. 5 is a flowchart illustrating an operation procedure of a femto base station that transmits SI in a broadband wireless communication system according to an exemplary embodiment of the present invention.

FIG. 5 is a flowchart illustrating an operation procedure of a femto base station that transmits SI in a broadband wireless communication system according to an exemplary embodiment of the present invention. The operation of FIG. 5 is performed at a point where the femto base station is installed.

Referring to FIG. 5, in step 501, the femto base station has its frame synchronized with a frame of a macro base station with which the femto base station is associated, and in step 503, receives unique ID information of the macro base station from the macro base station.

In step 505, the femto base station determines a transmission point of SI, i.e., a transmission frame index according to a predefined equation using unique ID information of the femto base station itself and the unique ID information of the macro base station. Here, the unique ID information of the femto base station includes a GCID, a CSG ID, and a TA ID, and may include information which combines the GCID, CSG ID, and TA ID. In addition, the unique ID information of the macro base station includes a GCID, a PCID, and a TA ID, and may include information that combines the GCID, PCID, and TA ID.

In step 507, the femto base station transmits SI including a GCID of the femto base station itself every transmission frame corresponding to the determined transmission frame index, and then ends the operation according to an exemplary embodiment of the present invention.

Figure 6:
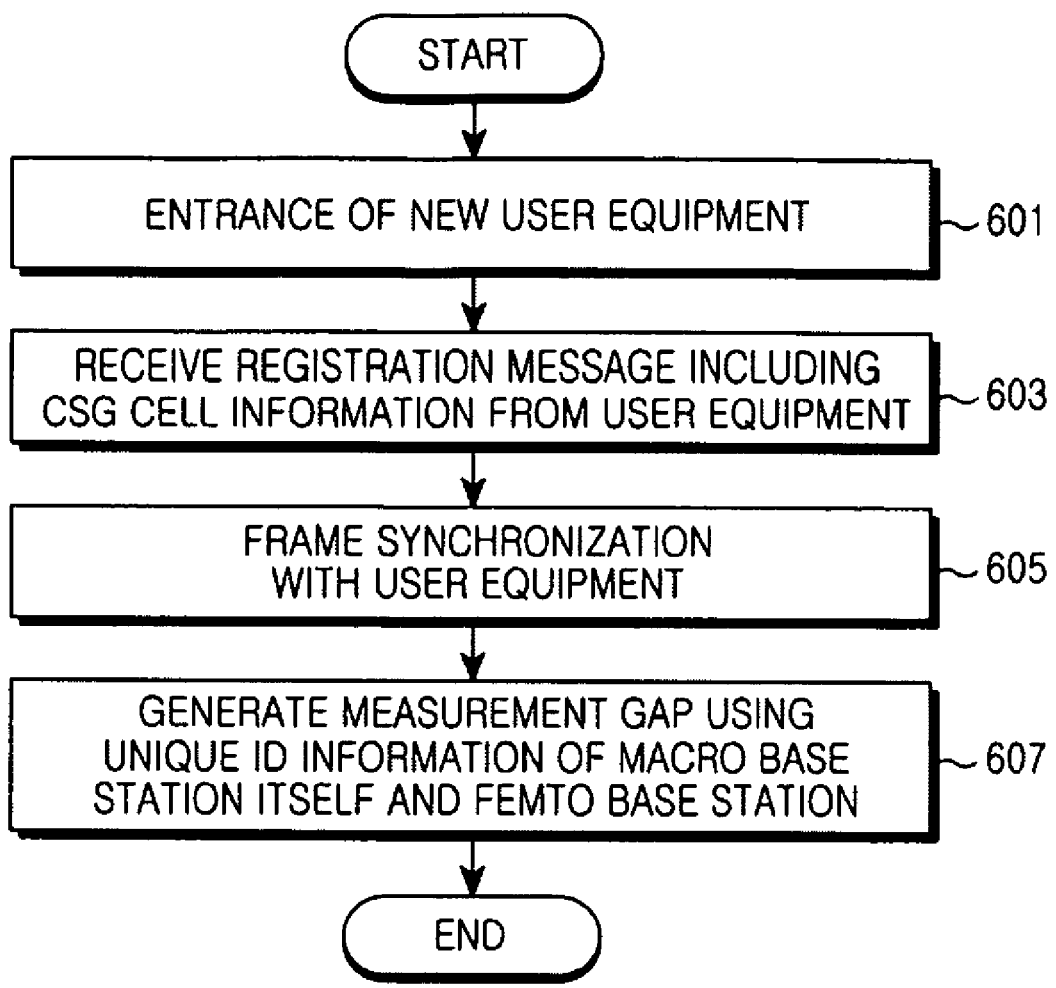
FIG. 6 is a flowchart illustrating an operation procedure of a macro base station that generates a measurement gap for receiving SI of a User Equipment (UE) in a broadband wireless communication system according to an exemplary embodiment of the present invention.

FIG. 6 is a flowchart illustrating an operation procedure of a macro base station that generates a measurement gap for receiving SI of a UE in a broadband wireless communication system according to an exemplary embodiment of the present invention.

Referring to FIG. 6, in step 601, a new UE having a femto base station that is associated with the macro base station as a CSG enters. In step 603, the macro base station receives a registration message including CSG information, i.e., information of femto base stations that the UE can access from the UE.

In step 605, the macro base station has its frame synchronized with a frame of the UE, and in step 607, determines a transmission frame index of SI for each femto base station according to a predefined equation using unique ID information of femto base stations corresponding to the CSG, and unique ID information of the macro base station itself, and generates a measurement gap pattern for receiving the SI.

Here, since the macro base station cannot perform communication with the UE during the measurement gap pattern, the macro base station should generate and recognize the measurement gap pattern.

Next, the macro base station ends the operation according to an exemplary embodiment of the present invention.

Figure 7:
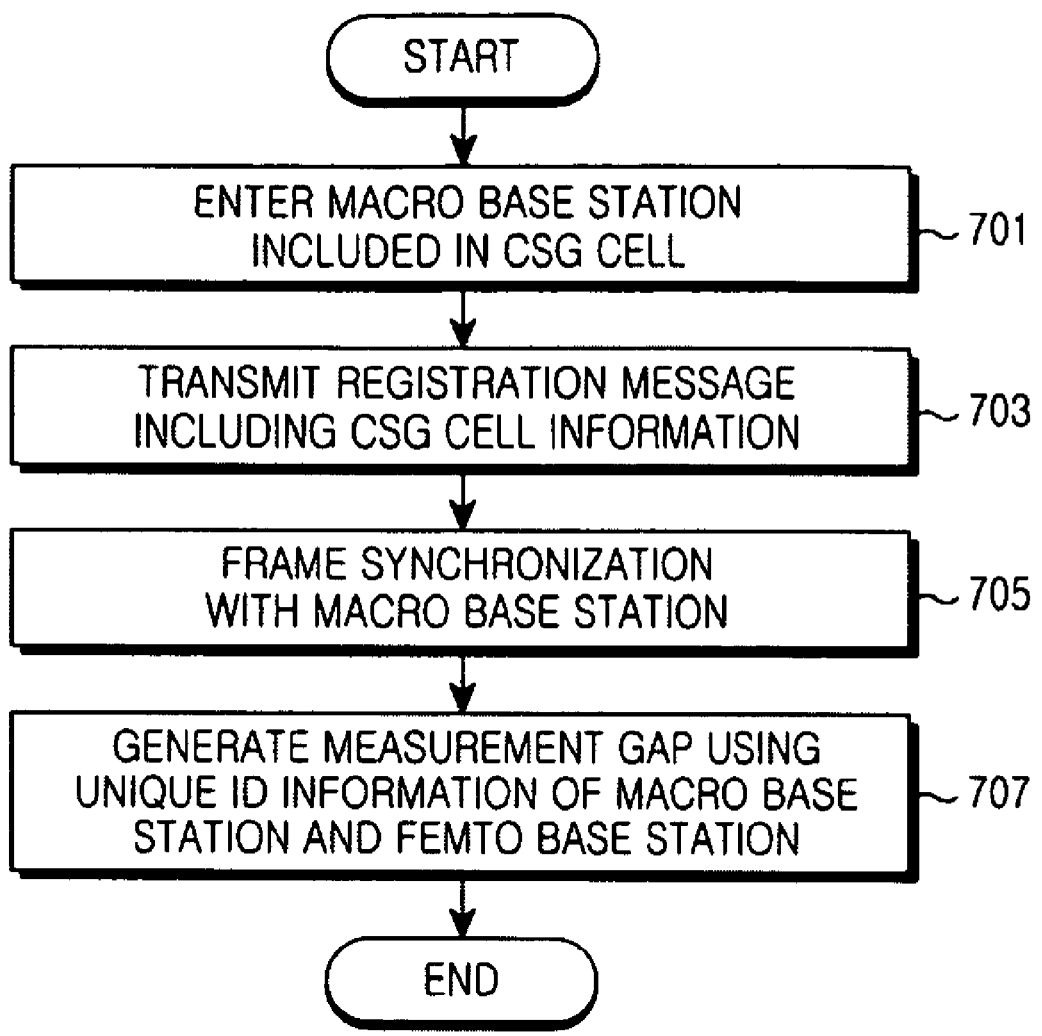
FIG. 7 is a flowchart illustrating an operation procedure of a UE that generates a measurement gap for receiving SI in a broadband wireless communication system according to an exemplary embodiment of the present invention.

FIG. 7 is a flowchart illustrating an operation procedure of a UE that generates a measurement gap for receiving SI in a broadband wireless communication system according to an exemplary embodiment of the present invention.

Referring to FIG. 7, in step 701, the UE enters a macro base station including a femto base station corresponding to a CSG, and in step 703, transmits, to the macro base station, a registration message including CSG information, i.e., information (for example, unique ID information) of femto base stations which the UE can access.

In step 705, the UE has its frame synchronized with a frame of the macro base station, and in step 707, determines a transmission frame index of SI for each femto base station according to a predefined equation using unique ID information of femto base stations included in the CSG, and unique ID information of the macro base station, and generates a measurement gap pattern for receiving the SI. At this point, the measurement gap pattern may be generated with consideration of an error in frame synchronization.

Next, the UE ends the operation according to an exemplary embodiment of the present invention.

In the descriptions of FIGS. 3 to 7, after determining a measurement gap pattern for receiving SI, the UE searches for a relevant femto base station every measurement gap determined above and receives the SI. In addition, rather than searching for the relevant femto base station every measurement gap, the UE may enter a region of the relevant femto base station, receive a PCID, and receive SI according to the determined measurement gap pattern as illustrated in FIG. 8.

Figure 8:
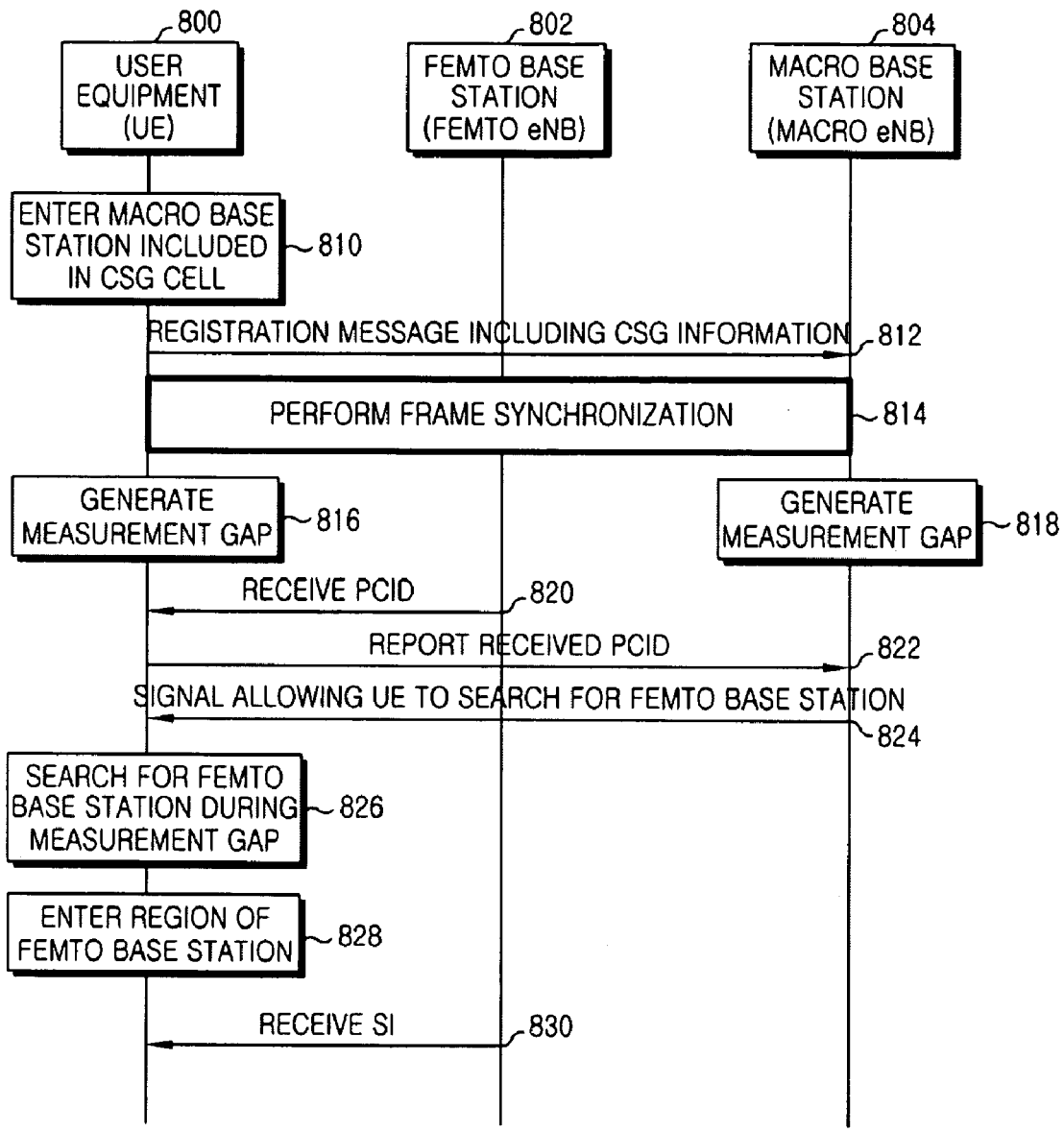
FIG. 8 is a view illustrating a signal flow for reception of SI in a broadband wireless communication system according to an exemplary embodiment of the present invention.

FIG. 8 is a view illustrating a signal flow for reception of SI in a broadband wireless communication system according to an exemplary embodiment of the present invention. FIG. 8 illustrates an operation after a femto base station is installed.

Referring to FIG. 8, in step 810, UE 800 enters a macro base station 804 with which a femto base station 802 corresponding to a CSG is associated, and in step 812, transmits, to the macro base station 804, a registration message including CSG information, i.e., information of femto base stations which the UE can access. In step 814, the UE 800 and the macro base station 804 have their frames synchronized, and in steps 816 and 818, independently determine a transmission frame index of SI for each femto base station using unique IDs of femto base stations included in the CSG, and a unique ID of the macro base station 804, and generate measurement gap patterns for receiving the SI, respectively.

In step 820, the UE 800 enters a region of a femto base station 802 and receives a PCID from the femto base station 802, and in step 822, informs the macro base station 804 that the UE 800 has received the PCID from the femto base station 802. In step 824, the macro base station 824 transmits, to the UE 800, a signal allowing the UE 800 to search for a femto base station according to the generated measurement gap pattern. At this point, the UE 800 is implicitly assigned the measurement gap for receiving SI by the femto base station 802.

In step 826, the UE 800 searches for the femto base station 802 during the measurement gap, and in step 828, enters a region of the femto base station 802, and in step 830, receives the SI including a GCID from the femto base station 802 during the measurement gap.

Figure 9:
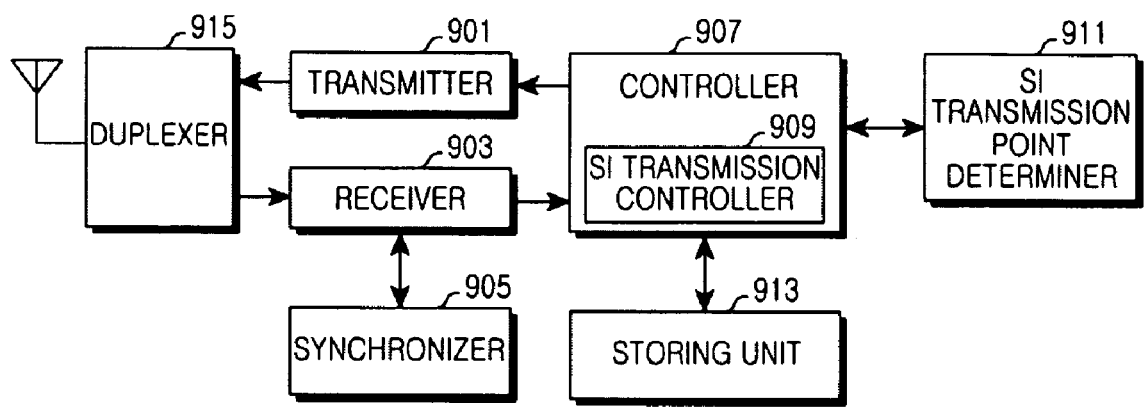
FIG. 9 is a block diagram illustrating a femto base station in a broadband wireless communication system according to an exemplary embodiment of the present invention.

FIG. 9 is a block diagram illustrating a femto base station in a broadband wireless communication system according to an exemplary embodiment of the present invention.

Referring to FIG. 9, the femto base station includes a transmitter 901, a receiver 903, a synchronizer 905, a controller 907, an SI transmission controller 909, an SI transmission point determiner 911, a storing unit 913, and a duplexer 915.

First, the duplexer 915 transmits a transmission signal provided from the transmitter 901 according to a duplexing scheme via an antenna, and provides a reception signal from the antenna to the receiver 903.

The transmitter 901 up-converts a baseband signal provided from the controller 907 into a Radio Frequency (RF) signal and provides the RF signal to the duplexer 915. The receiver 903 down-converts an RF signal received from the duplexer 915 via the antenna into a baseband signal and provides the baseband signal to the controller 907.

The synchronizer 905 synchronizes frames with frames of a macro base station using signals transmitted/received to/from the macro base station including the femto base station. That is, the synchronizer 915 synchronizes frames such that index numbers of frames currently transmitted/received to/from the macro base station are substantially matched with each other.

The controller 907 controls and processes overall operations of the femto base station. More particularly, the controller 907 provides unique ID information of the macro base station received via the receiver 903 and unique ID information of the femto base station itself stored in the storing unit 913 to the SI transmission point determiner 911, and controls and processes a function of transmitting SI including a GCID of the femto base station itself every transmission point determined by the SI transmission point determiner 911 by including the SI transmission controller 909.

The SI transmission point determiner 911 determines SI transmission point, i.e., a transmission frame index according to a predefined equation using the unique ID information of the macro base station received via the controller 907 and the unique ID information of the femto base station itself while the femto base station is installed.

The storing unit 913 stores the unique ID information of the femto base station itself. Here, the unique ID information of the femto base station includes a GCID, a CSG ID, and a TA ID, and may include information which combines the GCID, CSG ID, and TA ID.

Figure 10:
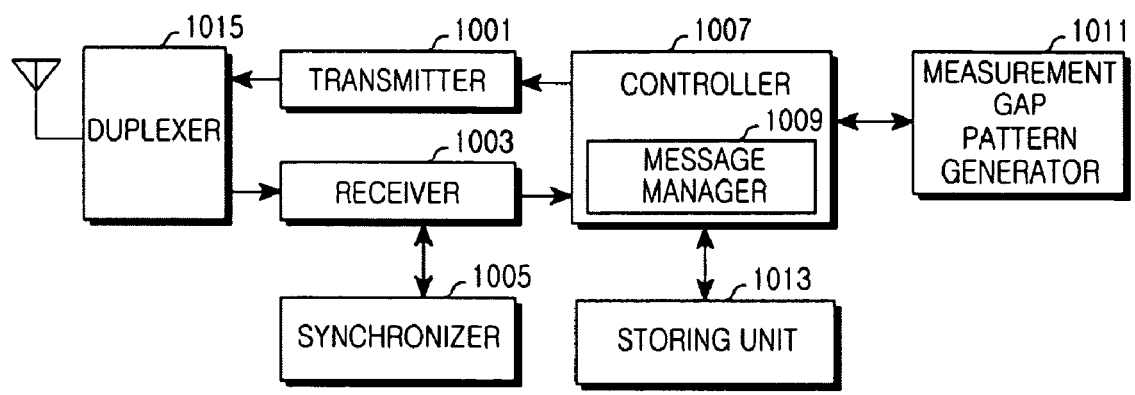
FIG. 10 is a block diagram illustrating a macro base station in a broadband wireless communication system according to an exemplary embodiment of the present invention.

FIG. 10 is a block diagram illustrating a macro base station in a broadband wireless communication system according to an exemplary embodiment of the present invention.

Referring to FIG. 10, the macro base station includes a transmitter 1001, a receiver 1003, a synchronizer 1005, a controller 1007, a message manager 1009, a measurement gap pattern generator 1011, a storing unit 1013, and a duplexer 1015.

The duplexer 1015 transmits a transmission signal provided from the transmitter 1001 according to a duplexing scheme via an antenna, and provides a reception signal from the antenna to the receiver 1003.

The transmitter 1001 up-converts a baseband signal provided from the controller 1007 into a Radio Frequency (RF) signal and provides the RF signal to the duplexer 1015. The receiver 1003 down-converts an RF signal received from the duplexer 1015 via the antenna into a baseband signal and provides the baseband signal to the controller 1007.

The synchronizer 1005 synchronizes frames with frames of a femto base station included in a region of the macro base station itself, and synchronizes frames with frames of UE that receives a service from the macro base station. That is, the synchronizer 1005 synchronizes frames such that index numbers of frames currently transmitted/received to/from the femto base station and the UE are synchronized with each other.

The controller 1007 controls and processes overall operations of the macro base station. More particularly, the controller 1007 controls a function of generating a message including unique ID information of the macro base station itself and transmitting the generated message to a relevant femto base station via the transmitter 1001, reads a registration message received from UE via the receiver 1003 to obtain unique ID information of a femto base station corresponding to a CSG of the UE, and provides the obtained information to the measurement gap pattern generator 1011 by including the message manager 1009.

The measurement gap pattern generator 1011 determines a transmission point of SI, i.e., a transmission frame index according to a predefined equation using the unique ID information of the macro base station itself and unique ID information of a femto base station provided from the message manager 1009, and generates a measurement gap pattern for receiving the SI based on the determined transmission frame index. At this point, the measurement gap pattern generator 1011 may generate the measurement gap pattern with consideration of an error in frame synchronization.

The storing unit 1013 stores the unique ID information of the macro base station itself. Here, the unique ID information of the macro base station includes a GCID, a CSG ID, and a TA ID, and may include information which combines the GCID, CSG ID, and TA ID.

Figure 11:
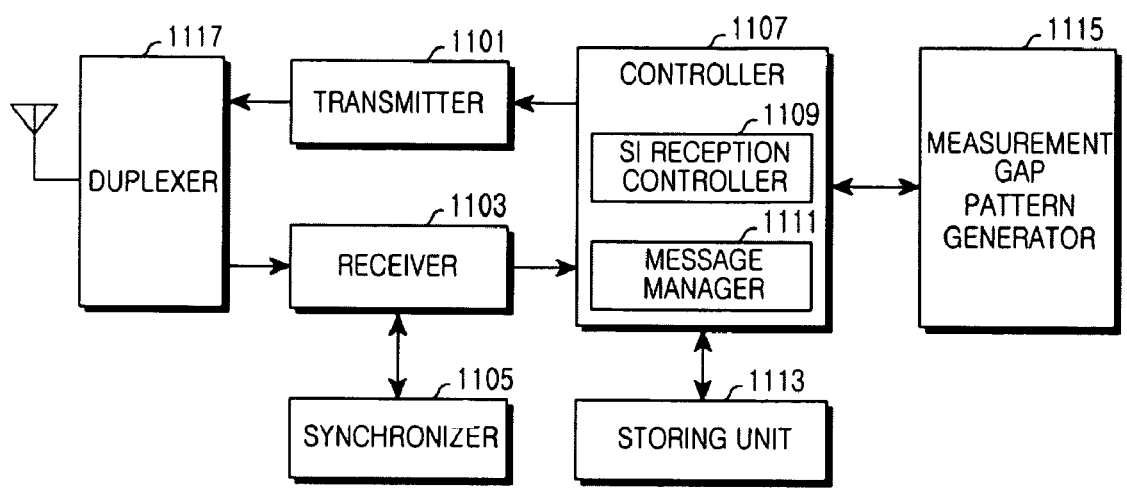
FIG. 11 is a block diagram illustrating a UE in a broadband wireless communication system according to an exemplary embodiment of the present invention.

FIG. 11 is a block diagram illustrating a UE in a broadband wireless communication system according to an exemplary embodiment of the present invention.

Referring to FIG. 11, the UE includes a transmitter 1101, a receiver 1103, a synchronizer 1105, a controller 1107, an SI reception controller 1009, a message manager 1111, a storing unit 1113, a measurement gap pattern generator 1115, and a duplexer 1117.

The duplexer 1117 transmits a transmission signal provided from the transmitter 1101 according to a duplexing scheme via an antenna, and provides a reception signal from the antenna to the receiver 1103.

The transmitter 1101 up-converts a baseband signal provided from the controller 1107 into a Radio Frequency (RF) signal and provides the RF signal to the duplexer 1117. The receiver 1103 down-converts an RF signal received from the duplexer 1117 via the antenna into a baseband signal and provides the baseband signal to the controller 1107.

The synchronizer 1105 synchronizes frames with frames of a macro base station, which the UE itself enters. That is, the synchronizer 1105 synchronizes frames such that index numbers of frames currently transmitted/received to/from the macro base station are synchronized with each other.

The controller 1107 controls and processes overall operations of the UE. More particularly, the controller 1107 controls and processes a function of receiving SI from a relevant femto base station every measurement gap pattern determined by the SI reception controller 1109 by including the SI reception controller 1109. In addition, the controller 1107 controls a function of generating a registration message including CSG information of the UE itself and transmitting the registration message to the macro base station via the transmitter 1101, reads a message received from the macro base station to obtain unique ID information of the macro base station, and provides the information to the measurement gap pattern generator 1115 by including the message manager 1111.

The storing unit 1113 stores an access allowance list (white list or fingerprint) including unique IDs of femto base stations which the UE can enter, i.e., femto base stations which belong to a CSG, and a unique ID of the macro base station with which the femto base station is associated.

The measurement gap pattern generator 1115 determines a transmission point of SI, i.e., a transmission frame index according to a predefined equation using the unique ID information of the macro base station and unique ID information of a femto base station stored in the storing unit 1113, and generates a measurement gap pattern for receiving the SI based on the determined transmission frame index. At this point, the measurement gap pattern generator 1115 may generate the measurement gap pattern with consideration of an error in frame synchronization.

According to exemplary embodiments of the present invention, a transmission point of SI of a femto base station is determined based on unique ID information of the femto base station and unique ID information of a macro base station in a broadband wireless communication system, UE and the macro base station generate measurement gap patterns representing an SI reception point, respectively. Accordingly, the SI may be received without a separate signaling message exchange, and a service requiring a high Quality of Service (QoS), such as VoIP, may be provided without interruption while a UE performs a handover from the macro base station to a femto base station.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A System Information (SI) transmission method of a femto base station in a wireless communication system, the method comprising:
    receiving, by the femto base station, unique identification information of a macro base station with which the femto base station is associated;
    determining, by the femto base station, a periodically recurring SI transmission point based on unique identification information of the femto base station itself and the received unique identification information of the macro base station; and
    transmitting, by the femto base station, SI comprising a Global Cell IDentifier (GCID) every SI transmission point.

2. The method of claim 1, wherein the determining of the periodically recurring SI transmission point by the femto base station comprises:
    determining an SI transmission frame index of the femto base station using the unique identification information of the macro base station and the unique identification information of the femto base station; and
    determining the transmission point based on the determined transmission frame index,
    wherein frames of the femto base station are synchronized with frames of the macro base station.

3. The method of claim 1, wherein the SI transmission point is determined using the equation:

$$\text{(Closed Subscriber Group (CSG) IDentifier (ID) of femto base station} + \text{Physical Cell ID (PCID) of macro base station)} \bmod N,$$

where N denotes a number of frames.

4. A System Information (SI) transmission apparatus of a femto base station in a wireless communication system, the femto base station comprising the apparatus, the apparatus comprising:
    a receiver for receiving unique identification information of a macro base station with which the femto base station is associated;
    a transmission point determiner for determining a periodically recurring SI transmission point based on unique identification information of the femto base station itself and the received unique identification information of the macro base station; and
    a transmitter for transmitting SI comprising a Global Cell IDentifier (GCID) every SI transmission point.

5. The apparatus of claim 4, wherein the transmission point determiner determines an SI transmission frame index of the femto base station based on the unique identification information of the macro base station and the unique identification information of the femto base station, and determines the transmission point based on the determined transmission frame index, and
    wherein frames of the femto base station are synchronized with frames of the macro base station.

6. The apparatus of claim 4, wherein the transmission point determiner determines the SI transmission point using the equation:

$$\text{(Closed Subscriber Group (CSG) IDentifier (ID) of femto base station} + \text{Physical Cell IDentifier (PCID) of macro base station)} \bmod N,$$

where N denotes a number of frames.

* * * * *